United States Patent Office 2,997,448
Patented Aug. 22, 1961

2,997,448
MOLDED FLUOROCARBON POLYMER PRODUCT AND METHOD OF PREPARING SAME
Jerome Hochberg, Newburgh, N.Y., assignor to E. I. du Pont de Nemours and Company, Wilmington, Del., a corporation of Delaware
No Drawing. Filed Sept. 24, 1958, Ser. No. 762,945
9 Claims. (Cl. 260—2.5)

This invention relates to a process of producing fluorocarbon polymer molded products from aqueous dispersions of fluorocarbon polymers and resulting products.

Various fluorocarbon polymers have outstanding electrical and heat insulation properties and have become widely adopted for many uses based on these properties. Such polymers include polyvinyl fluoride, polytetrafluoroethylene, polymonochlorotrifluoroethylene, copolymer of hexafluoropropene and vinylidene fluoride, copolymers of tetrafluoroethylene with other fluorinated ethylenically unsaturated monomers, such as, e.g., hexafluoropropene, vinyl fluoride and vinylidene fluoride. Particles of these polymers do not readily adhere to themselves due to their unctuous character. Polytetrafluoroethylene is the most widely used polymer where maximum heat and electrical insulation and chemical resistance are required.

Molded products made from these polymers have to-date been produced by subjecting dry particles to high temperatures and pressures simultaneously. In the case of polytetrafluoroethylene temperatures in excess of 621° F. and pressures in excess of 1000 p.s.i. are required to make molded products.

Prior art techniques of molding the fluorocarbon resins which involve high pressures result in a dense non-porous product.

The polymerization of fluorocarbon compounds is normally carried out in an aqueous medium and to form molding powders from the polymers requires separating the polymer from the aqueous polymerizing medium.

An object of this invention is the provision of a process of molding fluorocarbon polymers into porous shaped products at atmospheric pressure. A further object is the provision of a process of preparing molded porous shaped products directly from aqueous dispersions of fluorocarbon polymers without separating the polymer from the aqueous medium prior to shaping the molding composition into its final form. Another object of the invention comprehends filled, non-porous, molded fluorocarbon polymer shaped products produced at atmospheric pressure.

The foregoing objectives are accomplished by incorporating into an aqueous dispersion of a fluorocarbon polymer a hydraulic cement material which is capable of setting to a rigid form at substantially room temperature and without evaporating any appreciable amount of water, allowing the composition to set or convert from a liquid or paste to the solid state at substantially room temperature and atmospheric pressure. The most preferred embodiment of the invention involves the additional steps of heating the solid material to remove any uncombined water, fuse the fluorocarbon polymer into a self-supporting structure and extracting the inorganic component from the solid shaped article to produce a porous shaped product of the fluorocarbon polymer.

Throughout the specification and claims, the terms "setting," "to set" or "set" are used to denote the conversion of the molding composition from the liquid or semi-liquid state to the solid state.

By the term "hydraulic cement" is meant any inorganic material that hardens when combined with water, such as, e.g., plaster of Paris, Portland cement and Sorel cement (magnesium oxychloride, $3MgO \cdot MgCl_2 \cdot 11H_2O$).

The following specific examples are given by way of illustration and not limitation wherein all parts and percentage figures are expressed on a weight basis unless stated otherwise.

Example I

A high temperature and chemical resistant filter was made by first preparing the following composition:

| | Parts by weight |
|---|---|
| Aqueous dispersion of polytetrafluoroethylene: | |
|    Polytetrafluoroethylene | 60.0 ⎫ |
|    Water | 36.4 ⎬ 62.5 |
|    "Triton 100" (octyl phenyl polyglycol ether) | 3.6 ⎭ |
| Powdered plaster of Paris, $(Ca_2SO_4)_2 \cdot H_2O$ | 37.5 |
| | 100.0 |

The above composition was thoroughly mixed and poured into an open flat mold to a thickness of 80 mils. The composition was allowed to stand overnight at room temperature after which the composition was set to a rigid flat sheet. The sheet was removed from the mold and uncombined water was removed by drying for 3 hours at 220° F. The dried sheet was heated an additional 3 hours at 550° F., followed by a final heating for 30 minutes at 700° F. to fuse or sinter the polytetrafluoroethylene particles distributed throughout the set plaster of Paris. The product at this stage was 80 mils thick, rigid and porous. It is useful as a heat and chemical resistant filter.

The rigid product at this stage is also useful as a relatively low load rigid bearing surface due to the lubricity afforded by the fused polytetrafluoroethylene.

The rigid product can be rendered flexible by soaking it in toluene until the product is thoroughly wetted throughout and then gently flexed throughout its area to break up the plaster of Paris matrix for the fused polytetrafluoroethylene structure.

Example II

An electrical insulation material having a low dielectric constant and low dissipation factor useful in high frequency electrical circuits was made from the fused rigid sheet material of Example I by immersing it for 48 hours in the following composition maintained at its boiling temperature:

| | Parts by weight |
|---|---|
| Water | 72.3 |
| Tetra sodium salt of ethylene diamine tetracetic acid | 27.2 |
| Duponol C (sodium lauryl sulfate) | .5 |
| | 100.0 |

The plaster of Paris was solubilized and extracted from the rigid sheet during the 48 hour immersion in the above composition maintained at its boiling temperature. After removal from the above composition, the sheet was thoroughly washed with water to remove occluded solubilized material. After drying, the sheet was porous and compressible. It consisted entirely of polytetrafluoroethylene and had the following physical properties:

| | |
|---|---|
| Dielectric constant at 1 megacycle | 1.3 |
| Dissipation factor | 0.0008 |
| Density | 0.8 |
| Thickness (mils) | 80.0 |
| Tensile strength (p.s.i.) | 192.0 |

Example III

A shaped filter element useful for filtering fine particles from highly corrosive chemicals was made by preparing the following composition:

| | Parts by weight | |
|---|---|---|
| Aqueous dispersion of polytetrafluoroethylene: | | |
| Polytetrafluoroethylene | 60.0 | |
| Water | 36.4 | 62.5 |
| "Triton 100" | 3.6 | |
| Plaster of Paris | 37.5 | |
| | 100.0 | |

After thoroughly mixing, the above composition was poured into a mold open to the atmosphere to form a cylindrical element closed at one end. The composition was allowed to stand in the mold at room temperature until the composition was set to a rigid shaped form. The rigid product was removed from the mold and dried at about 220° F. until substantially all of the uncombined water was removed by evaporation. The dry product was next baked for about 4 hours at about 550° F., followed by heating above the fusion temperature of polytetrafluoroethylene (621° F.), i.e., about 700° F. for about 30 minutes.

The shaped and fused product was immersed in the plaster of Paris extracting bath of Example II, maintained at its boiling point for a period of about 48 hours during which time substantially all of the plaster of Paris was solubilized and extracted from the shaped product. The product was thoroughly washed with water to remove occluded solubilized material and then dried.

*Example IV*

A non-permeable polytetrafluoroethylene sheet material was made by surface coating the rigid sheet of Example I, i.e., the sheet material prior to the extraction of the plaster of Paris, with the aqueous dispersion of polytetrafluoroethylene employed in the molding composition of Example I. Two coats of the aqueous dispersion of polytetrafluoroethylene (without the plaster of Paris) were applied to one side of the rigid sheet with drying and fusing the surface coating after each successive coat by subjecting the sheet material to a temperature of about 700° F. for a period of about 5 minutes which is sufficient to fuse the surface coating into an impermeable layer. About 2 ounces per square yard of dry surface coating are applied by the two coats.

The product was an impermeable and abrasion resistant product.

*Example V*

A foamed polytetrafluoroethylene insulation material was made by vigorously agitating the molding composition of Example I with an aerating type of mixer immediately after the composition is thoroughly mixed and before any appreciable set has taken place to form a frothed composition. The frothed composition was poured into an open mold of the desired shape and allowed to set at room temperature. The product was subjected to the same heating cycles as employed for the sheet material of Example I. The dried and fused product was a rigid low density (.3 to .4 specific gravity) product resistant to deformation or decomposition at temperatures up to 621° F.

*Example VI*

A compressible polytetrafluoroethylene fiber reinforced polytetrafluoroethylene gasket material was made in accordance with the following procedure. A mass of polytetrafluoroethylene staple fibers (6 denier, 4.5 inches long) was formed into a non-woven mat, weighing about 11.0 ounces per square yard, on a card and then needle punched to forcibly orient at least some of the fibers substantially perpendicular to the face of the mat to tie the fibers together into a self-supporting mat. The needle punched mat was thoroughly impregnated with the molding composition of Example I after it was thoroughly mixed and before any appreciable set had taken place. The impregnant was allowed to set at room temperature and the impregnated product was subjected to the same drying and fusing conditions as employed for the sheet material of Example I.

After fusing, the product weighed about 50 oz./sq. yd. and had a tensile strength of about 700 p.s.i. A similar sheet without the fiber reinforcement had a tensile strength of about 300 p.s.i. Resistance to breaking or cracking under impact and flexing was considerably greater in the case of the fiber reinforced sheet as compared to the non-fiber reinforced sheet.

*Example VII*

A product similar to the fiber reinforced product of Example VI, but with greater rigidity and weight, was made by using a non-woven glass mat weighing about 50 ounces per square yard in place of the non-woven mat of polytetrafluoroethylene fibers.

*Example VIII*

A porous 5 mil thick film of polytetrafluoroethylene was made from the following composition:

| | Parts by weight | |
|---|---|---|
| Aqueous dispersion of polytetrafluoroethylene: | | |
| Polytetrafluoroethylene | 60.0 | |
| Water | 36.4 | 250 |
| "Triton 100" | 3.6 | |
| Plaster of Paris | 150 | |
| Sodium chloride | 4 | |

The above composition was thoroughly mixed and cast at 5 mils thickness onto a highly polished aluminum belt. The sodium chloride caused the composition to set before any appreciable drying took place, thus preventing the formation of microscopic mud cracks. After the composition had become thoroughly set, it was subjected to the drying and fusing conditions employed for the sheet material of Example I. The plaster of Paris was extracted by immersing the rigid film in boiling aqueous solution of 10% hydrochloric acid until all the plaster of Paris is solubilized and extracted leaving a porous film of fused polytetrafluoroethylene. The fused film is washed with water to remove traces of solubilized material and then dried. The film is slit into narrow widths, that is, about 3/8 to 2 inches wide for use as a cable wrap where low power factor and high temperature resistance is essential.

Essentially similar results are obtained by replacing the aqueous dispersion of polytetrafluoroethylene in the above examples with aqueous dispersions of polyvinyl fluoride, polymonochlorotrifluoroethylene, copolymer of 70–30% hexafluoropropene and 30–70% vinylidene fluoride and copolymer of 95–50% tetrafluoroethylene and 5–50% hexafluoropropene.

The plaster of Paris in the above formulas is replaceable on an equivalent basis with other hydraulic cements, such as, e.g., Portland cement, Sorel cement or the various hydraulic cements described by R. H. Bogue in "The Chemistry of Portland Cement," published in 1947 by Reinhold Publishing Corporation, particularly those described on pages 21–26.

This invention comprehends using blends of any or all of the above-mentioned polymeric fluorocarbons as well as blends of any or all of the above-mentioned hydraulic cements. It is also within the scope of this invention to incorporate other modifying components in the molding compositions, such as, e.g., pigments and fillers.

New and novel products are produced by impregnating the porous molded products of this invention with the polymeric fluorocarbons described above or non-fluorocarbon resins, such as, e.g., epoxy resins, silicone resins and phenolic resins. The porous molded products may also be coated and/or impregnated with molten metals or alloys, such as, e.g., solder, lead, and cadmium.

It is preferred to use the minimum amount of water in the compositions of this invention in order to cut down on the drying time. The minimum amount of water is that which is sufficient to supply the stoichiometric water of crystallization or hydration for the plaster of Paris or other equivalent component and to provide a fluid matrix during the mixing of the molding composition. The maximum amount of water is determined by the strength required for handling the set material prior to fusing.

The operable limits for the ratio of the unhydrated hydraulic cement to solid polymeric fluorocarbon are:

| | Parts by weight |
|---|---|
| Polymeric fluorocarbon | 20 to 80 |
| Hydraulic cement | 80 to 20 |

This invention has as one of its outstanding advantages the preparation of molded products at atmospheric pressure directly from aqueous dispersions of fluorocarbon polymer resin materials without separating the polymer from the aqueous medium prior to molding.

While there are above disclosed but a limited number of embodiments of the structure, process and product of the invention herein presented, it is possible to produce still other embodiments without departing from the inventive concept herein disclosed, and it is desired, therefore, that only such limitations be imposed on the appended claims as are stated therein, or required by the prior art.

The embodiments of the invention in which an exclusive property or privilege is claimed are defined as follows:

1. The process of molding shaped articles directly from an aqueous dispersion of a fluorocarbon polymer selected from the group consisting of polytetrafluoroethylene, polyvinyl fluoride, polymonochlorotrifluoroethylene, copolymer of 95–50% tetrafluoroethylene and 5–50% hexafluoropropene, and copolymer of 70–30% vinylidene fluoride and 30–70% hexafluoropropene, which comprises mixing with said dispersion a particulate unhydrated hydraulic cement selected from the class consisting of plaster of Paris, Portland cement and Sorel cement, the weight ratio of fluorocarbon polymer to hydraulic cement varying between 20 to 80 parts by weight of the former and 80 to 20 parts by weight of the latter, allowing said mixture to set to the solid state at atmospheric pressure in a mold, removing the resultant molded article from said mold and heating said molded article to the fusion temperature of said fluorocarbon polymer.

2. The process of claim 1 which comprises the additional step of extracting the set hydraulic cement from said molded article after said fusing step by immersing said article in a liquid which dissolves said set hydraulic cement and washing the solubilized cement from said article.

3. The process of molding shaped articles directly from an aqueous dispersion of polytetrafluoroethylene which comprises mixing with said dispersion unhydrated plaster of Paris, the weight ratio of the polytetrafluoroethylene to plaster of Paris varying between 20 to 80 parts by weight of the former and 20 to 80 parts by weight of the latter, allowing said mixture to set to the solid state at atmospheric pressure in a mold, removing the molded article from said mold and heating the molded article to the fusion temperature of said polytetrafluoroethylene.

4. The process of claim 3 which comprises the additional step of extracting the set hydraulic cement from said molded article after said fusing step by immersing said article in a liquid which dissolves said set hydraulic cement and washing the solubilized cement from said molded article.

5. A molded article comprising 80–20 parts by weight of a fused fluorocarbon polymer selected from the class consisting of polytetrafluoroethylene, polyvinyl fluoride, polymonochlorotrifluoroethylene, copolymer of 95–50% tetrafluoroethylene and 5–50% hexafluoropropene, and copolymer of 70–30% vinylidene fluoride and 30–70% hexafluoropropene; and a set hydraulic cement in an amount corresponding to 20 to 80 parts of the unhydrated form, said hydraulic cement being selected from the class consisting of plaster of Paris, Portland cement and Sorel cement.

6. A molded article comprising 80–20 parts by weight of fused polytetrafluoroethylene and set plaster of Paris in an amount corresponding to 20 to 80 parts by weight of the unhydrated form.

7. A mass of fibers selected from the class consisting of glass and polytetrafluoroethylene, having distributed throughout said mass of fibers the composition of claim 5.

8. The product of claim 7 in which the fibers are polytetrafluoroethylene.

9. The product of claim 7 in which the fibers are glass.

References Cited in the file of this patent

UNITED STATES PATENTS

| 2,089,813 | Rice | Aug. 10, 1937 |
| 2,256,483 | Johnston | Sept. 23, 1941 |
| 2,384,611 | Douthett | Sept. 11, 1945 |
| 2,400,091 | Alftan | May 14, 1946 |
| 2,592,147 | Ikeda | Apr. 8, 1952 |
| 2,613,193 | Osdal | Oct. 7, 1952 |
| 2,806,256 | Smith-Johannsen | Sept. 17, 1957 |
| 2,819,209 | Pall et al. | Jan. 7, 1958 |